Oct. 19, 1937.  R. LAPSLEY  2,096,304
TRANSMISSION
Original Filed Jan. 31, 1931   2 Sheets-Sheet 2

Inventor:
Robert Lapsley
By: Brown, Jackson, Boettcher & Dienner
Attys.

Patented Oct. 19, 1937

2,096,304

UNITED STATES PATENT OFFICE 2,096,304

TRANSMISSION

Robert Lapsley, Buchanan, Mich., assignor to Clark Equipment Company, Buchanan, Mich., a corporation of Michigan Original application January 31, 1931, Serial No. 512,596. Divided and this application May 2, 1934, Serial No. 723,449

11 Claims. (Cl. 74—325)

This application is a division of my Patent 1,992,898, granted February 26, 1935.

The present invention relates generally to automobile transmissions, and more particularly to a new and improved countershaft or secondary shaft construction.

The present construction which illustrates one embodiment of my invention is particularly adapted for transmissions employing helical gears, since the mounting of the gears and the countershaft is particularly arranged to take care of the axial thrusts arising from the use of helical gears.

Figure 1:
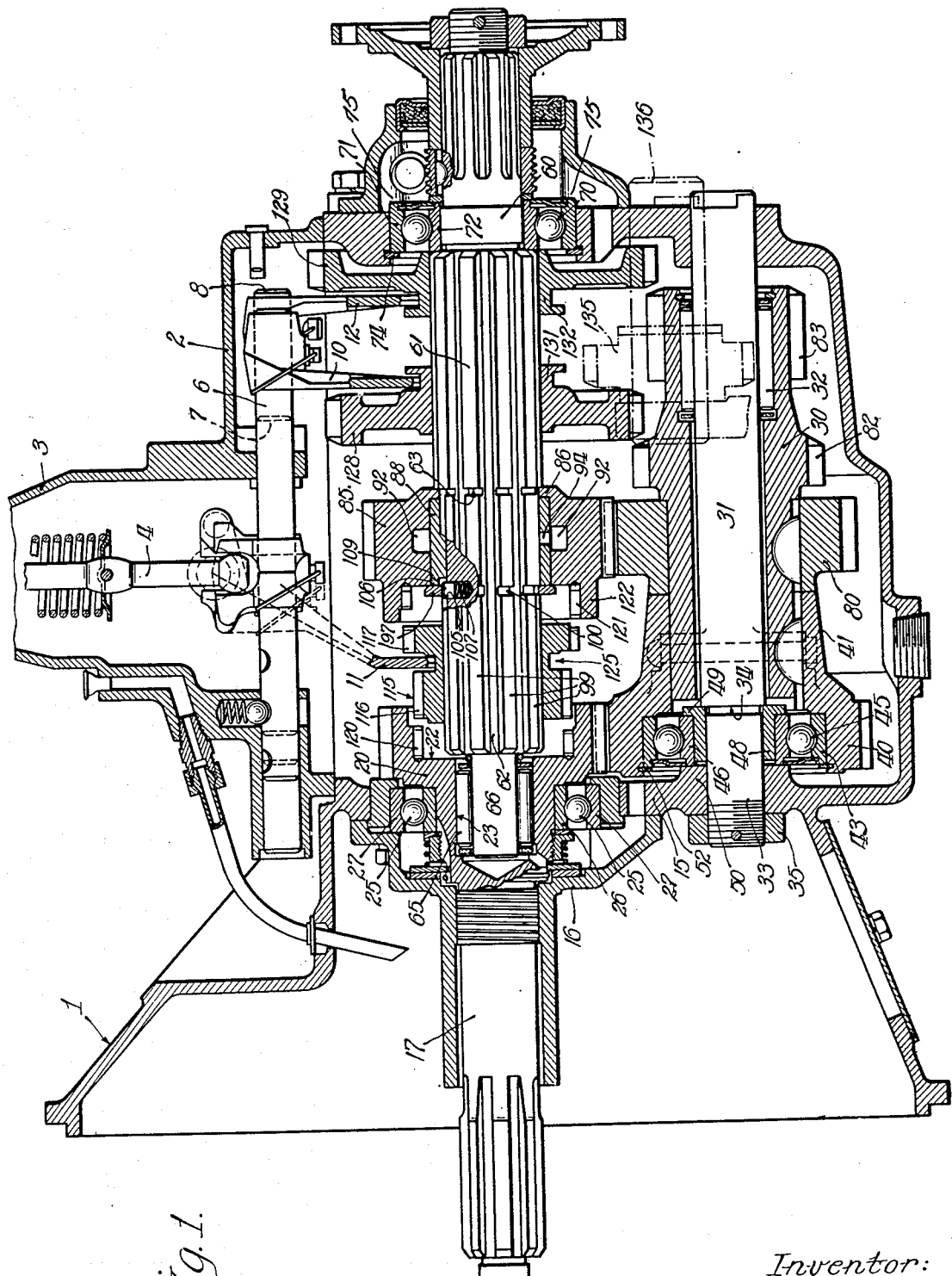
Figure 2:
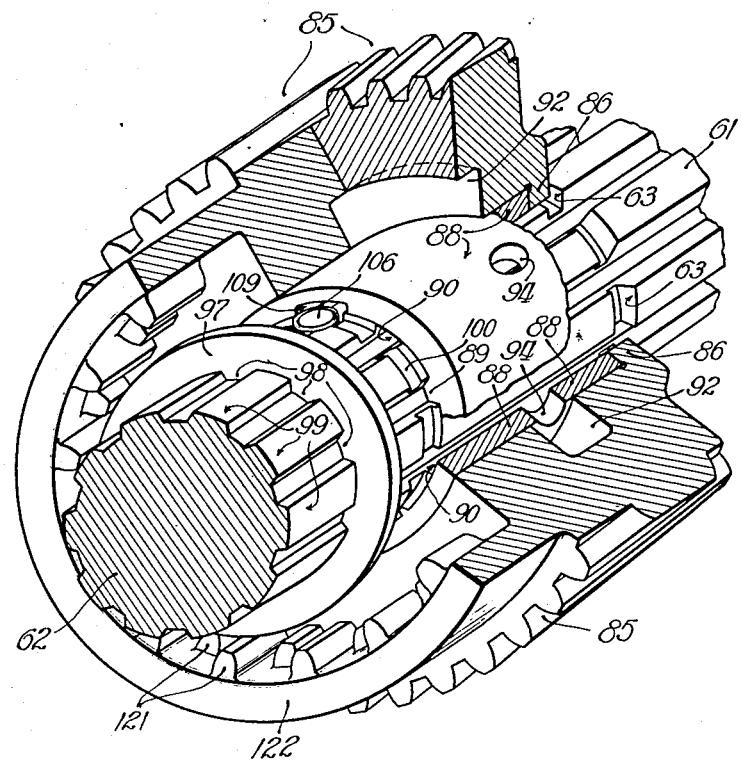

Other objects and advantages of the present invention will be apparent to those skilled in the art after a consideration of the following detailed description of the preferred structural embodiment, taken in conjunction with the accompanying drawings, in which:

Figure 1 is a vertical cross-sectional view through a transmission embodying the principles of the present invention; and Figure 2 is an enlarged perspective with some parts in section, showing how one of the helical gears is mounted on the driven shaft and how the means holding the helical gear is brought into place on the driven shaft.

In the drawings, the reference numeral 1 indicates in its entirety the housing of the transmission. The housing 1 carries a cover plate 2 having the pedestal 3 in which is mounted the usual gear shift lever, the lower end of which is indicated by the reference numeral 4, and the associated shift rods 6, 7 and 8 carrying the shift forks 10, 11 and 12 in the usual and well known manner. The forward web 15 of the transmission housing 1 carries a bearing cap 16 in which is journaled the driving shaft 17 which is adapted to be connected at its forward end to the clutch of an automobile motor (not shown). The rear end of the driving shaft 17 carries or has formed integrally therewith a driving gear 20 which is provided with a pair of axial concentric bores 22 and 23 the purpose of which will be described later.

The driving gear 20 is journaled in the transmission housing 1 by means of ball bearings 25 having an inner race 26 secured to the driving gear 20 and an outer race 27 mounted in the forward web 15 of the transmission housing.

A tubular secondary or countershaft 30 is journaled in the lower part of the transmission housing. For this purpose the housing carries a fixed shaft 31 carrying a roller bearing structure 32 upon which the rear end of the tubular countershaft 30 is supported. The forward end 33 of the fixed shaft 31 is reduced and threaded, there being a shoulder 34 between the forward and the rear portions of the fixed shaft. A nut 35 is adapted to be threaded onto the reduced end 33 of the fixed shaft and to effectively secure the shaft in position in the transmission housing. The forward end of the tubular countershaft 30 carries a helical driven gear 40 which is arranged to be in constant mesh with and driven by the driving gear 20 which also is a helical gear. The driven gear 40 is formed with an extended hub portion 41 having a bore receiving the forward end of the countershaft 30 to which the hub 41 and the driven gear 40 are fixedly secured as by a key or other means.

The driven gear 40 is formed with an axial recess which receives the outer race 43 of the bearing means supporting the driven gear 40 and the forward end of the tubular countershaft. This bearing means comprises a plurality of anti-friction elements in the form of balls 45 operating between the outer race 43 and an inner race 46. The latter is mounted on a flanged washer 48, one end of which abuts against the shoulder 34 on the fixed shaft while the flange 49 thereof abuts against the inner race 46 so that when the nut 35 is tightened the bearing means for the driven shaft 40 is effectively clamped and secured in place in the transmission housing 1 against the forward web 15. In order to better position these parts the web 15 is provided with an annular boss 50 to receive the inner race 46 thereagainst. The outer race 43 is held in place in the driven gear 40 by a spring ring 52 snapped into a suitably formed groove in the driven gear 40. The driven gear and the bearing means just described are so arranged that any forward thrust transmitted to the driven gear is resisted by the balls 45, and the outer and inner races 43 and 48.

A driven shaft 60 is journaled for rotation in the transmission housing 1. This shaft comprises splined portions 61 and 62 of different diameters, there being a circumferential and forwardly facing shoulder 63 between these two portions. The forwardmost end 66 of the driven shaft 60 is reduced and is suitably supported by bearings 65 in the axial bore 23 formed in the driving gear 20. As shown in Figure 1 this bearing means comprises a plurality of rollers. The rear end of the driven shaft 60 is supported in the housing 1 by bearing means 70 arranged to take both axial and radial thrusts, the same as the bearing means 45 for the driven gear and the countershaft. The bearing means 70 comprises a plurality of balls mounted between a fixed outer race 71, held in place by a bearing cap 73 which engages the outer edge of the outer race 71 as indicated at 75, and an inner race 72 secured to the driven shaft 60 in the usual manner. A spring ring 74 holds the outer race 71 in proper position in the rear wall of the transmission housing 1 and up against the bearing cap 73.

The tubular countershaft or secondary shaft 30 carries a helical gear 80 suitably keyed thereto and a pair of smaller gears 82 and 83, the latter being preferably formed integrally with the countershaft 30 but may be separate parts keyed or otherwise secured to the countershaft if desired. The helical gear 80 is in constant mesh with a corresponding helical gear 85 journaled on the driven shaft 60. This gear is provided with an inwardly extending radial flange 86 received against the abutment shoulder 63 whereby the gear 85 is prevented from moving rearwardly. The gear 85 is mounted on a bushing 88 having a smooth exterior surface to form a bearing support for the gear 85 and a plurality of teeth 89 adapted to be received between the splines on the portion 62 of the driven shaft 60. As best shown in Figure 2 the splines 89 are interrupted so that there is a space or opening 90 between certain splines so that lubricant may find its way between the bushing 88 and the driven shaft 60. The gear member 85 is provided with an interior circumferential groove 92 and the bushing 88 is provided with one or more openings 94 so that the lubricant may flow in through the spaces 90 and the openings 94 into the groove 92.

The rear end of the bushing or bearing member 88 contacts with the flange 86 and holds the same against the shoulder 63 on the driven shaft 60. The bushing 88 is itself held in position by a toothed ring or washer 97, best shown in Figure 2. As shown, the washer 97 is provided with a plurality of teeth 98 which are spaced to correspond to the splines 99 on the smaller splined portion of the driven shaft 60. The splines 99 are interrupted adjacent the forward edge or end of the bushing 88 so as to form in effect a circumferential groove 100 on the driven shaft.

When assembling the gear 85 and the bushing 88 on the driven shaft 60, the gear 85 is first slipped over the forward end of the driven shaft and brought in position thereon with its flange 86 in abutting engagement with the shoulder 63. Next the bushing 88 is slipped onto the smaller splined portion 62 of the driven shaft 60 with the teeth thereof positioned as indicated in Figure 2. Lastly the toothed washer 97 is passed over the forward end of the shaft 60, as indicated in Figure 2, and then when it reaches the groove 100 the washer is given a slight turn to bring the teeth 98 thereof in the groove 100 and behind the splines 99. The driven shaft 60 is provided with a radial bore 105 in which is mounted a pin or plunger 106 which is normally urged outwardly by a spring 107 seated in the bore 105. When the washer or ring 97 is turned behind the splines 99, the spring pressed plunger or pin 106 moves outwardly and occupies a position between adjacent teeth 98 on the ring or washer 97 so as to effectively hold or lock the washer and the associated bushing 88 in place. If necessary, the bushing 88 may be provided with a small recess or relief 109 to accommodate the spring pressed plunger 106. The bushing 88 may be removed to permit the removal of the gear 85 by depressing the plunger 106 with a suitable tool and rotating the toothed washer 97 back to the position shown in Figure 2.

A sliding clutch dog or hub 115 is mounted on the splined portion 62 of the driven shaft 60 and is provided with two sets of teeth 116 and 117 which are adapted to engage, respectively, with teeth 120 formed on the interior of the axial bore or recess 22 of the driving gear 20 and with teeth 121 formed interiorly of the forward hub 122 on the floating gear 85. A shifter groove 125 on the driving hub 115 is embraced by the arms of the shift fork 11.

A pair of gears 128 and 129 are mounted on the larger splined portion 61 of the driving gear 60 and each have grooved hubs 131 and 132 engaged respectively by the shift forks 10 and 12. The gear 128 is adapted to be shifted forwardly to engage the gear 82 on the countershaft 30 and to be moved rearwardly to engage the idler or reverse gear 135 journaled on an idler shaft 136 supported in the transmission housing 1. The gear 129 is adapted to be shifted forwardly to engage with the gear 83 on the countershaft 30. The gear 83 is provided with relatively long teeth so as to drive the idler or reverse gear 135.

The operation of the transmission constructed according to the present invention is substantially as follows. Low speed or first speed is attained by actuating the shift rod 8 to move the gear 129 into engagement with the gear 83 on the countershaft 30. The latter shaft is being constantly driven from the driving gear 20 on the driving shaft 17 and hence the drive is transmitted through the driving gear 20 and the driven gear 40 to the countershaft 30 and through gear 83 to the gear 129 splined on and driving the driven shaft 60. For second speed the shift rod 6 is actuated to move the gear 128 forwardly into engagement with the gear 82, and for third speed the shift rod 7 is actuated to move the sliding dog or clutch hub 115 rearwardly so that the teeth 117 engage the teeth 121 on the gear 85. With this arrangement the drive is transmitted from the driving shaft 17 through the driving gear 20 and the driven gear 40 to the countershaft 30, which drives the helical gear 80 and the helical gear 85, these gears being constantly in mesh. The gear 85 is freely rotatable on the driven shaft 60 but when the clutch dog 115 is moved rearwardly the gear 85 is connected with the driven shaft 60 and hence in third speed the drive is through the helical gears 80 and 85.

Since the gears 20, 40, 80 and 85 are helical gears there are components of axial thrust which must be taken care of. Remembering that the gear 85 has its flange 86 held against the abutment shoulder 63 on the driven shaft 60 by the bushing 88 and washer 97, it will be observed that any forward thrust of the gear will be transmitted by the bushing 88 and the washer 97 to the driven shaft 60 and its bearing 70—72 in the rear of the housing and that rearward axial thrust of the gear 85 will be transmitted directly to the driven shaft and to its bearing 70—72 in the transmission housing without going through the bushing 88 or bearing means by which the gear is rotatably held on the driven shaft 60. The corresponding thrust of the gear 80 which is keyed onto the tubular countershaft 30 is transmitted by the countershaft directly forward to its bearing means 45 at the forward end of the transmission. The thrust of gear 20 is taken care of by its bearing 25—27. In this way the driving strains in the transmission are effectively resisted by parts which are best constructed to withstand them.

While I have shown and described in detail the preferred structural embodiment of the present invention it is to be understood that the principles of my invention can be employed in means which is widely different from that shown in the drawings.

What I claim, therefore, and desire to secure by Letters Patent is:

1. In a change speed gearing comprising a housing, a tubular countershaft, a helical gear mounted on said countershaft, a stationary shaft fixed in said housing and having a reduced threaded end forming a shoulder on said stationary shaft, said tubular shaft being mounted on said stationary shaft, and bearing means for supporting said countershaft and including a part clamped against rotation between said shoulder and housing when the threaded end of said fixed shaft is tightened in the housing.

2. In a change speed transmission including a housing and a tubular shaft disposed therein, bearing means for one end of said tubular shaft including a stationary inner race clamped to the housing, an outer race seated in a recess in said tubular shaft, anti-friction elements disposed between said races and operative to take both radial and axial loads, and bearing means for the other end of said tubular shaft and capable of taking radial loads.

3. A change speed transmission comprising, in combination, a housing, a stationary shaft fixed in said housing, a tubular countershaft disposed on said fixed shaft, roller bearing means for one end of said tubular shaft for supporting the latter on the fixed shaft, a helical gear carried by said countershaft and provided with a recess, and bearing means for the other end of said countershaft including a race fixed to said stationary shaft and a second bearing race mounted in said recess.

4. In a change speed transmission, a housing, a stationary shaft fixedly supported in said housing and including means forming a shouldered radial projection near one end of the housing, a countershaft journaled for rotation on said stationary shaft, a recessed gear carried by said countershaft near one end thereof, and bearing means disposed in the recess of said gear and having an inner race fixedly carried by said stationary shaft and clamped between said shouldered means thereof and the housing.

5. Shaft and bearing mountings for a transmission having a housing with shafts therein carrying helical gears connected to the latter in thrust transmitting relation, said shaft and bearing mountings comprising bearing means for one of said shafts including a plurality of anti-friction elements and inner and outer races therefor, means clamping one of said races to the housing to secure the same against movement in either direction, means securing the other race to said one shaft to secure the race against movement relative thereto in either direction whereby said bearing means is capable of resisting the forward thrust of the helical gear on said one shaft, bearing means for said other shaft including a plurality of anti-friction elements and inner and outer races therefor, means clamping one race to the rear portion of said other shaft, and means securing the other race to the housing, whereby the rearward thrust of the helical gear on said other shaft is resisted.

6. In combination, in a transmission, a stationary shaft, a tubular countershaft rotatable thereabout, bearing means between one end of said countershaft and said stationary shaft and adapted to take radial loads only, and bearing means comprising anti-friction members and inner and outer races between said shafts at the opposite end of said countershaft, one of said races being clamped against movement relative to said countershaft and the other of said races being clamped against movement relative to said stationary shaft.

7. In combination, in a transmission including a housing, a stationary shaft, a tubular countershaft rotatable thereon and carrying a plurality of helical gears, bearing means between said shafts at opposite ends of said countershaft, one of said bearing means being adapted to resist only radial thrust, and the other of said bearing means being retained against movement relative to each of said shafts and said housing for resisting both axial and radial thrusts.

8. In combination, a stationary shaft, a bearing race secured against relative movement with respect thereto, a tubular countershaft, rotatable about said stationary shaft and having an axially recessed end, a cooperating bearing race in the recess of said countershaft, means carried by said countershaft preventing relative movement of said last-named race with respect thereto, and anti-friction means between said bearing races.

9. In combination, a stationary shaft, a tubular countershaft having an axial bore loosely fitting said stationary shaft and having a radially enlarged recess at one end thereof, bearing means in said recess including inner and outer bearing races respectively confined against movement relative to said stationary shaft and said countershaft, and anti-friction means between said races, said bearing means being disposed radially outwardly of said bore.

10. In combination, in a transmission, a stationary shaft, a tubular countershaft rotatably mounted thereon and carrying helical gear means, and means for supporting said tubular countershaft on said stationary shaft including bearing means disposed within the longitudinal extent of the countershaft and adapted to take both axially and radially directed thrusts.

11. Shaft and bearing mountings for a transmission that includes a housing, driving and driven shafts therein, a countershaft journaled in said housing, and helical gear means mounted to transmit axial thrusts to and serving to connect said countershaft and one of said driving and driven shafts, said mountings including bearing means serving to support one end of the countershaft and capable of resisting both radial thrusts and the thrusts transmitted thereto by said helical gear means, bearing means taking radial loads only for supporting the other end of the countershaft, and bearing means for said one shaft capable of resisting both radial thrusts and the axial thrusts transmitted thereto by said gear means.

ROBERT LAPSLEY.